United States Patent [19]

Ikeda et al.

[11] Patent Number: 5,725,067
[45] Date of Patent: Mar. 10, 1998

[54] WHEEL SPEED CORRECTING SYSTEM

[75] Inventors: Toru Ikeda; Ryoji Mori; Fumiaki Honjyo; Hironobu Kiryu; Shuji Shiraishi, all of Wako, Japan

[73] Assignee: Honda Giken Kogyo Kabushiki Kaisha, Tokyo, Japan

[21] Appl. No.: 611,782

[22] Filed: Mar. 8, 1996

[30] Foreign Application Priority Data

Mar. 9, 1995 [JP] Japan ................... 7-050157

[51] Int. Cl.$^6$ .................... B60K 31/00
[52] U.S. Cl. .................... 180/197; 364/426.019
[58] Field of Search ............ 180/197; 364/426.019, 364/426.036

[56] References Cited

U.S. PATENT DOCUMENTS

| 4,984,165 | 1/1991 | Muller et al. | 180/197 |
| 5,197,008 | 3/1993 | Itoh et al. | 180/197 |
| 5,272,635 | 12/1993 | Nakayama | 180/197 |

FOREIGN PATENT DOCUMENTS 4-121439  4/1992  Japan .

*Primary Examiner*—Brian L. Johnson
*Assistant Examiner*—Avraham Lerner
*Attorney, Agent, or Firm*—Armstrong, Westerman, Hattori, McLeland & Naughton

[57] ABSTRACT

When a steady straight advancing state presuming device presumes that the vehicle is in a steady straight advancing state, and a slip rate calculating device calculates a small slip rate, based on an output from a driving-state detecting device, or when the steady straight advancing state presuming device presumes that the vehicle is in the steady straight advancing state, and a driven wheel torque calculating device calculates a small driven wheel torque, based on the output from the driving-state detecting device, a correction execution determining device determines that the vehicle is in a stable state suitable for correcting the wheel speed. By a command from the correction execution determining device, a correcting device corrects the driven wheel speed or the follower wheel speed based on a speed ratio of the driven wheel speed to the follower wheel speed calculated by a speed ratio calculating device. Thus, when a different-diameter tire has been mounted on a wheel, it is possible to precisely correct the wheel speed without being influenced by the slipping of the driven wheels or by the turning of the vehicle.

5 Claims, 4 Drawing Sheets

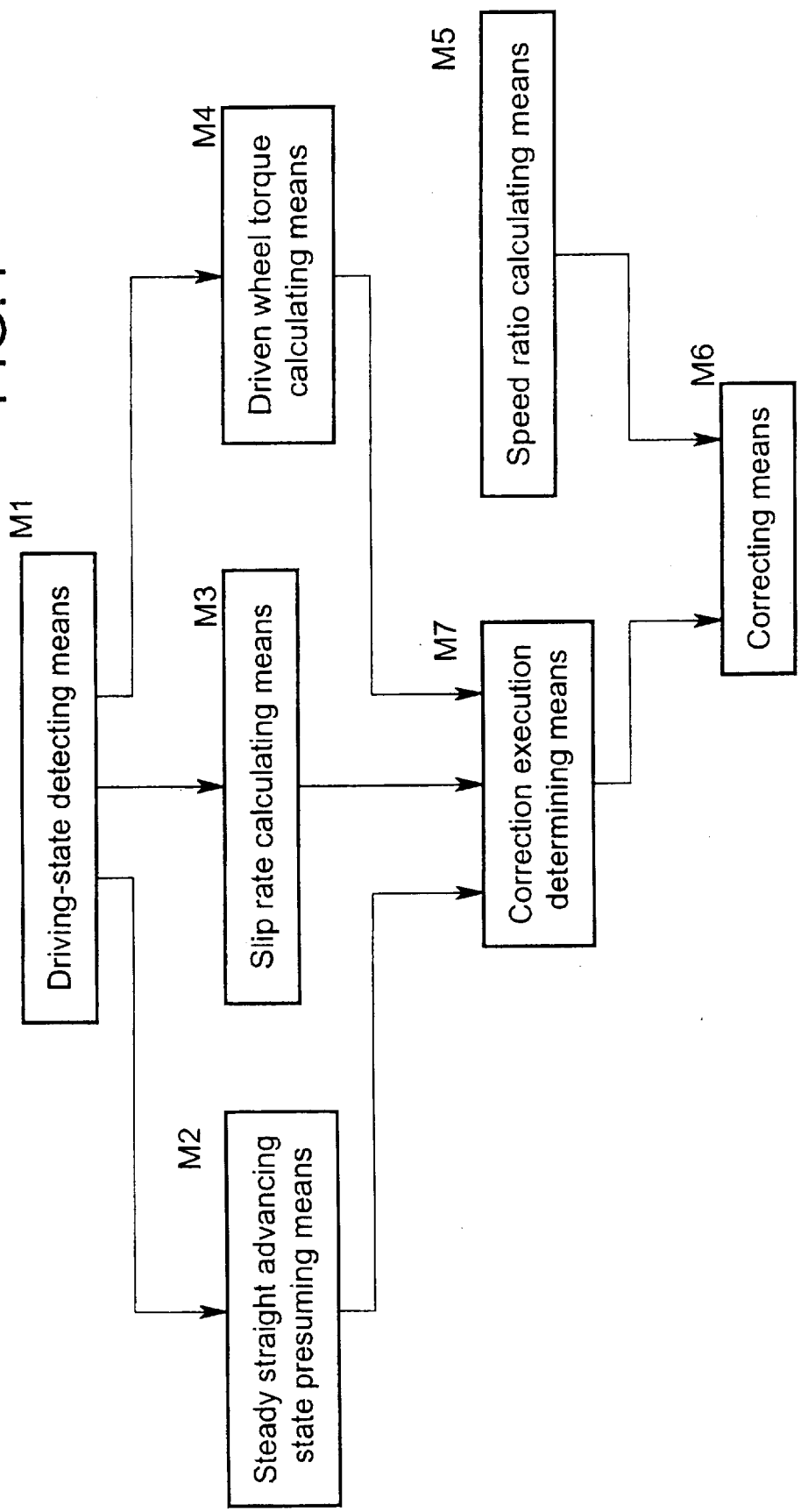

WHEEL SPEED CORRECTING SYSTEM

BACKGROUND OF THE INVENTION

1. Field of the Invention

The present invention relates to a wheel speed correcting system for use in a control system having a wheel speed as a control signal, such as a traction control system or an anti-lock brake system. More particularly, the invention relates to a wheel speed correcting system for correcting a wheel speed error generated when a tire having a different diameter, such as a spare tire, is mounted.

2. Description of the Related Art

When a tire having a diameter different from those of other tires is used for a front or rear wheel of a vehicle, an error is produced in a detected wheel speed due to the different tire. A wheel speed correcting system is known for correcting such error, such that a ratio of the front wheel speed to the rear wheel speed is calculated from an average value of the left and right front wheel speeds and an average value of the left and right rear wheel speeds, and if the ratio of the front wheel speed to the rear wheel speed exceeds a predetermined value, it is determined that a different-diameter tire has been mounted, and the front or rear wheel speed is corrected (see Japanese Patent Application Laid-open No. 121439/92).

When the vehicle is not in a stable driving state, (e.g., when the driven wheels slip, or when the loci of the driven and follower wheels are displaced due to the turning), a speed ratio is generated between the driven and follower wheels even if a different-diameter tire is not used. However, the above known system has a problem that even when the vehicle is in the stable driving state, the correction of the wheel speed is carried out and hence, an error of the intrinsic wheel speed due to the mounting of a different-diameter tire fails to be corrected and thus, the traction control system or the anti-lock brake system cannot be controlled appropriately.

SUMMARY OF THE INVENTION

Accordingly, it is an object of the present invention to provide a wheel speed correcting system, wherein the wheel speed can be precisely controlled without being influenced by the slipping of the driven wheels or by the turning of the vehicle.

To achieve the above object, according to a first aspect and feature of the present invention, there is provided a wheel speed correcting system, comprising: a driving-state detecting means for detecting a driving state of a vehicle, including at least a driven wheel speed and a follower wheel speed, a steady straight advancing state presuming means for presuming a steady straight advancing state of the vehicle based on an output from the driving-state detecting means, a slip rate calculating means for calculating a slip rate of the driven wheel based on the output from the driving-state detecting means, a driven wheel torque calculating means for calculating a torque of the driven wheel based on the output from the driving-state detecting means, a speed ratio calculating means for calculating a speed ratio of the driven wheel speed to the follower wheel speed, a correcting means for correcting the driven wheel speed or the follower wheel speed based on an output from the speed ratio calculating means, and a correction execution determining means for determining the execution of the correction, when the steady straight advancing state presuming means presumes a steady straight advancing state of the vehicle, and the slip rate of the driven wheel calculated by the slip rate calculating means is equal to or smaller than a predetermined value, or when the steady straight advancing state presuming means presumes the steady straight advancing state of the vehicle, and the torque of the driven wheels calculated by the driven wheel torque calculating means is equal to or smaller than a predetermined value.

With the first feature of the present invention, when the steady straight advancing state presuming means presumes the steady straight advancing state of the vehicle, and the slip rate of the driven wheel calculated by the slip rate calculating means is equal to or smaller than a predetermined value, or when the steady straight advancing state presuming means presumes the steady straight advancing state of the vehicle, and the torque of the driven wheels calculated by the driven wheel torque calculating means is equal to or smaller than a predetermined value, the correction execution determining means determines the execution of the correction. Therefore, it is possible to carry out a precise correction with a reduced error in a stable state which is not influenced by the turning of the vehicle or by the slipping of the driven wheels.

According to a second aspect and feature of the present invention, in addition to the first feature, the steady straight advancing state presuming means presumes the steady straight advancing state of the vehicle, if a difference in speed between the driven and follower wheel speeds is equal to or larger than a predetermined value, even if the yaw rate of the vehicle is not within a predetermined value.

With the second feature of the present invention, if the difference in speed between the driven and follower wheel speeds is equal to or larger than the predetermined value, even if the yaw rate of the vehicle is not within the predetermined value, it is determined that the variation in yaw rate is due to the mounting of a different-diameter tire. Therefore, the driven wheel speed or the follower wheel speed can be corrected, even when the different-diameter tire has been mounted.

According to a third aspect and feature of the present invention, in addition to the first feature, the steady straight advancing state presuming means does not presume the steady straight advancing state of the vehicle, if an amount of driven wheel speed varied within a predetermined time, or an amount of follower wheel speed varied within a predetermined time, is equal to or larger than a predetermined value.

With the third feature of the present invention, it is possible to carry out a precise correction with a reduced error.

According to a fourth aspect and feature of the present invention, in addition to the first feature, the steady straight advancing state presuming means presumes the steady straight advancing state of the vehicle based on the output from the driving-state detecting means for a predetermined time.

With the fourth feature of the present invention, it is possible to carry out a precise correction with a reduced error without being influenced by a noise or the like.

According to a fifth aspect and feature of the present invention, in addition to the first feature, the speed ratio calculating means calculates a speed ratio based on a plurality of driven wheel speeds and follower wheel speeds detected within a predetermined time period.

With the fifth feature of the present invention, it is possible to carry out a precise correction with a reduced error without being influenced by noise or the like.

The above and other objects, features and advantages of the invention will become apparent from the following detailed description of a preferred embodiment taken in conjunction with the accompanying drawings.

BRIEF DESCRIPTION OF THE DRAWINGS

FIG. 4 is a block diagram of the wheel speed correcting system.

DETAILED DESCRIPTION OF THE PREFERRED EMBODIMENT

The present invention will now be described by way of a preferred embodiment with reference to the accompanying drawings.

Figure 1:
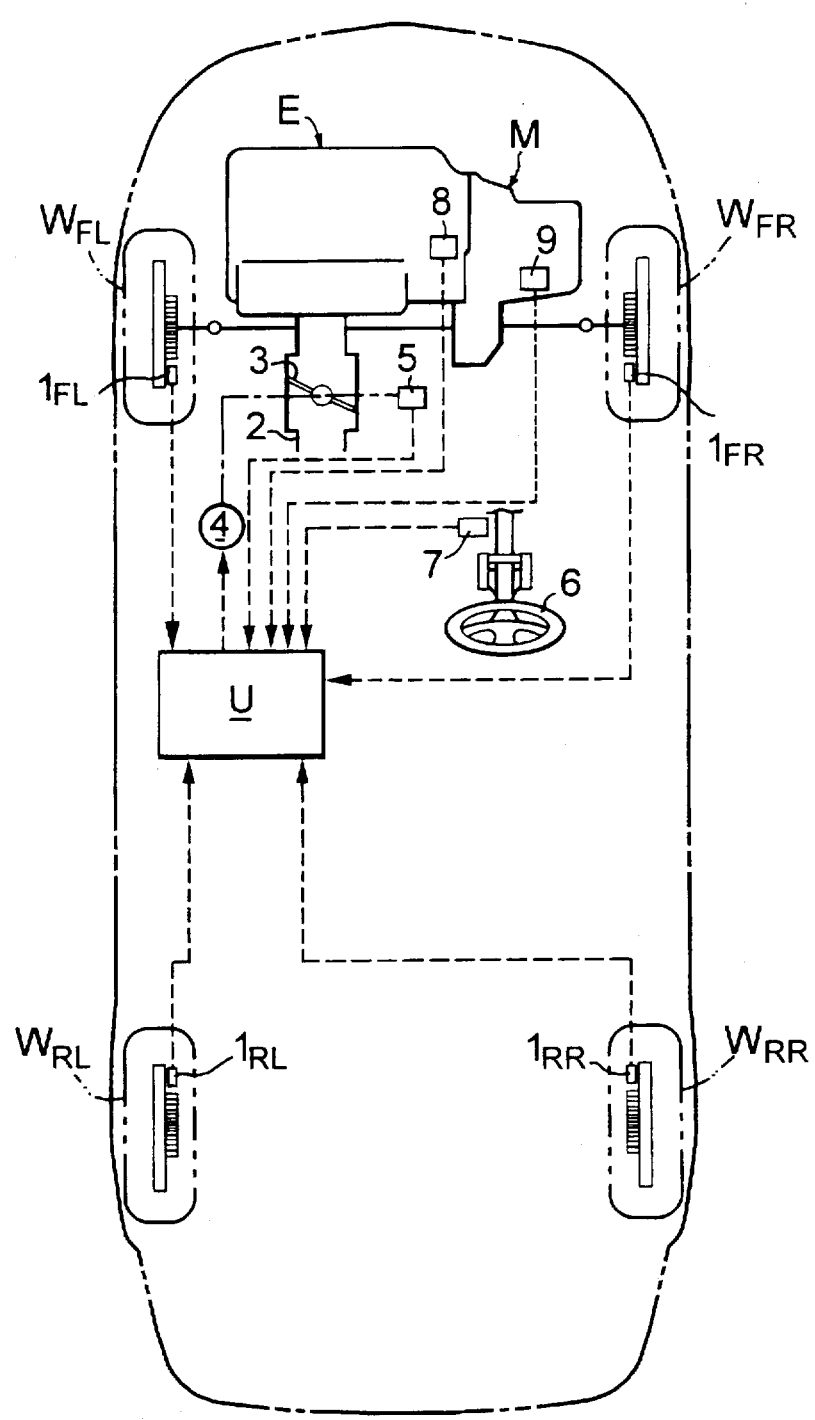
FIG. 1 is a diagrammatic illustration of the arrangement of a vehicle equipped with a wheel speed correcting system.

FIG. 1 shows a front wheel drive vehicle. This vehicle includes a pair of left and right driven wheels $W_{FL}$ and $W_{FR}$ (front wheels) driven by an engine E, and a pair of left and right follower wheels $W_{RL}$ and $W_{RR}$ (rear wheels) rotated with the traveling of the vehicle. The wheel speed VWFL of the left driven wheel $W_{FL}$ and the wheel speed VWFR of the right driven wheel $W_{FR}$ are detected by driven wheel speed sensors $1_{FL}$ and $1_{FR}$, respectively, and the wheel speed VWRL of the left follower wheel $W_{RL}$ and the wheel speed VWRR of the right follower wheel $W_{RR}$ are detected by follower wheel speed sensors $1_{RL}$ and $1_{RR}$, respectively.

A throttle valve 3 is mounted in an intake passage 2 of the engine E and opened and closed by a pulse motor 4. Signals from the driven wheel speed sensors $1_{FL}$ and $1_{FR}$ and follower wheel speed sensors $1_{RL}$ and $1_{RR}$, a throttle opening degree sensor 5 for detecting an opening degree TH of the throttle valve 3, steering angle sensor 7 for detecting a steering angle δ of a steering wheel 6, an engine revolution-number sensor 8 for detecting a number NE of revolutions of the engine, and a gear ratio sensor 9 for detecting a gear ratio GR at a shift stage established in a transmission M, are input to an electronic control unit U, such as a computer, where these signals are mathematically processed. On the basis of results of the mathematical processing, the pulse motor 4 is driven to reduce the engine torque in order to control excessive slipping of the driven wheels $W_{FL}$ and $W_{FR}$. In this case, the electronic control unit U determines whether a different-diameter tire such as a spare tire has been mounted, according to a program which will be described hereinafter. If the different-diameter tire has been mounted, the wheel speed of the wheel having the different-diameter tire mounted thereon is corrected.

As shown in FIG. 4, a wheel speed correcting system according to the present invention includes a driving-state detecting means M1, a steady straight advancing state presuming means M2, a slip rate calculating means M3, a driven wheel torque calculating means M4, a speed ratio calculating means M5, a correcting means M6, and a correction execution determining means M7.

The driving-state detecting means M1 detects the driving state of the vehicle by various sensors. Specifically, the driving-state detecting means M1 includes the driven wheel speed sensors $1_{FL}$ and $1_{FR}$, the follower wheel speed sensors $1_{RL}$ and $1_{RR}$, the throttle opening degree sensor 5, the steering angle sensor 7, the engine revolution-number sensor 8 and the gear ratio sensor 9.

The steady straight advancing state presuming means M2 presumes that the vehicle is in a steady straight advancing state which is not an accelerated state or a turning state, based on an output from the driving-state detecting means M1.

The slip rate calculating means M3 calculates a slip rate of the driven wheels $W_{FL}$ and $W_{FR}$ based on the signal from the driving-state detecting means M1.

The driven wheel torque calculating means M4 calculates a torque of the driven wheels $W_{FL}$ and $W_{FR}$ based on the signal from the driving-state detecting means M1.

The speed ratio calculating means M5 calculates a speed ratio of the driven wheel speed to the follower wheel speed due to the mounting of the different-diameter tire or the like, by using a statistical technique which will be described hereinafter.

The correcting means M6 corrects either the driven wheel speed or the follower wheel speed based on the speed ratio calculated in the speed ratio calculating means M5, thereby compensating for a detection error of the wheel speed due to the mounting of the different-diameter tire.

Based on outputs from the correction execution determining means M7, the steady straight advancing state presuming means M2, the slip rate calculating means M3 and the driven wheel torque calculating means M4, it is determined whether the vehicle is in a stable state suitable for the correction of the wheel speed. If a predetermined condition is satisfied, the correcting means M6 is commanded to correct the wheel speed.

Figure 2:
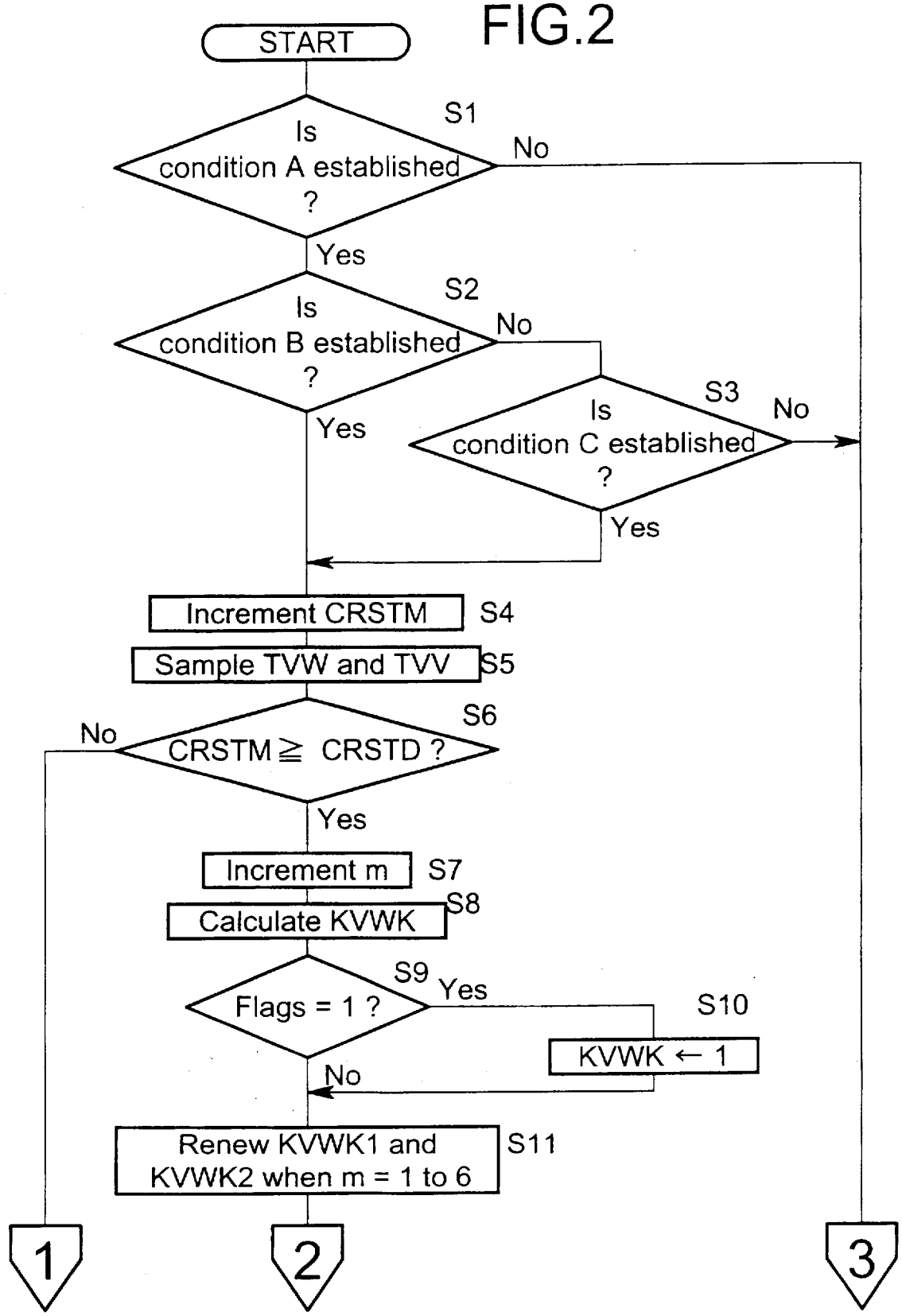
FIG. 2 is a first section of a flow chart.
Figure 3:
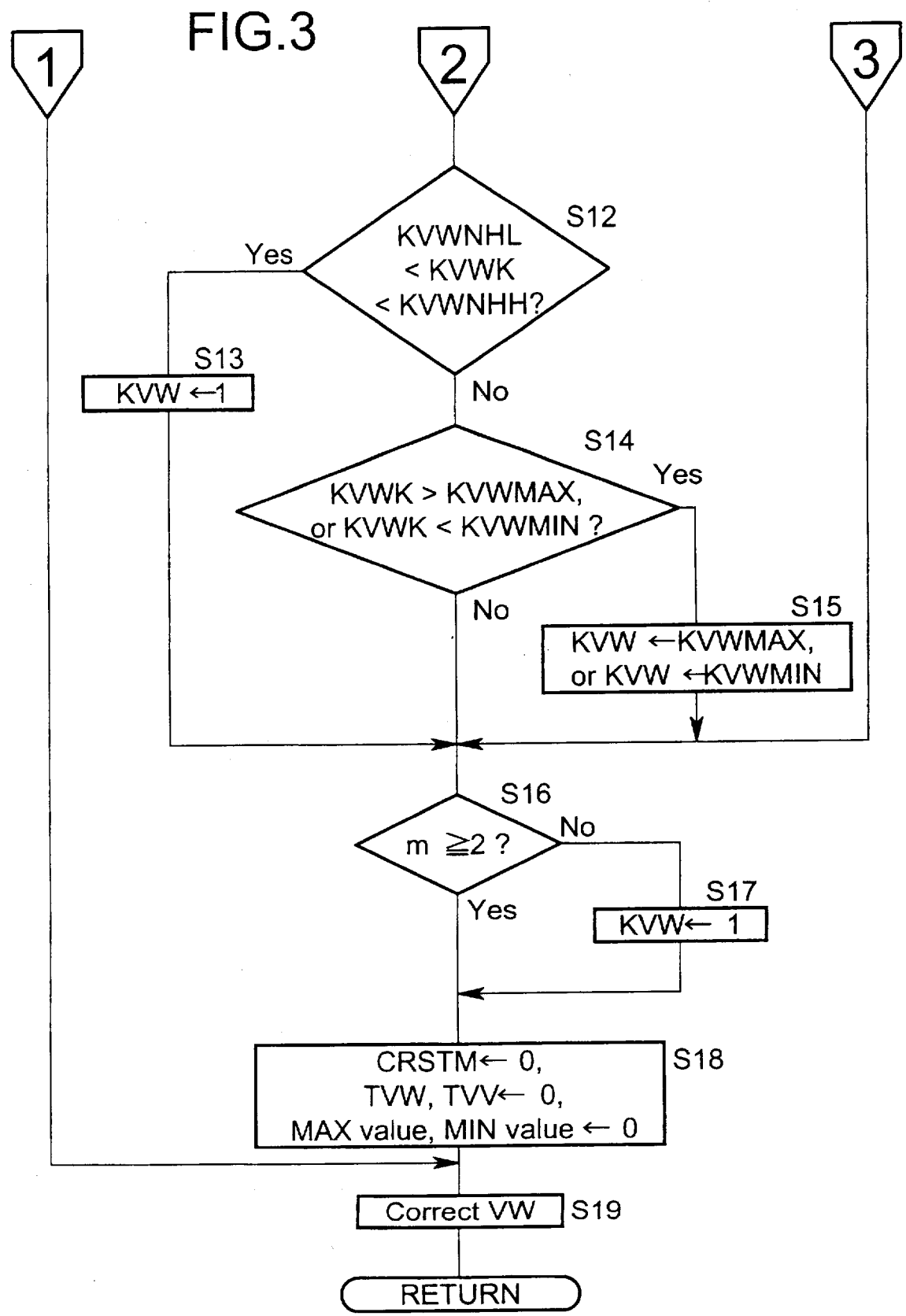
FIG. 3 is a second section of the flow chart.

The operation of the embodiment of the present invention will be described belong with reference to the flow chart illustrated in FIGS. 2 and 3.

Steps S1, S2 and S3 illustrate the function of the correction execution determining means M7, determining whether the driving state of the vehicle is in a stable state suitable for correcting the wheel speed. For this purpose, three Stable conditions A, B and C are determined. When Stable conditions A and B are established, or when the Stable conditions A and C are established, it is determined that the driving state of the vehicle is a stable state, suitable for correcting the wheel speed. Thus, the satisfaction of the Stable condition A is essential. If either of Stable condition B or C is established in addition to Stable condition A, the correction of the wheel speed is carried out. The three Stable conditions A, B and C will be described in sequence.

1. Stable condition A

Stable condition A corresponds to the function of the steady straight advancing state presuming means M2 and includes twelve condition factors A-1 to A-12. If all of the condition factors A-1 to A-12 are satisfied, Stable condition A is established.

Condition factor A-1

This condition factor A-1 means that the absolute value |FID| of a front yaw rate FID calculated based on the wheel speeds VWFL and VWFR of the left and right driven wheels $W_{FL}$ and $W_{FR}$ (detected by the driven wheel speed sensors $1_{FL}$ and $1_{FR}$) satisfies the following expression (1):

$$|FID| \leq STID \qquad (1)$$

and the following value |RID| of a rear yaw rate RID calculated based on the wheel speeds VWRL an VWRR of the left and right follower wheels $W_{RL}$ and $W_{RR}$ (detected by the follower wheel speed sensors $1_{RL}$ and $1_{RR}$) satisfies the following expression (2):

$$|RID| \leq STID \qquad (2)$$

wherein STID is a ROM value (a ROM valve is a predetermined value stored in a ROM).

When the expressions (1) and (2) are established, it is determined that the vehicle is in a straight advancing state, thereby validating the condition factor A-1. However, even when the expression (1) is established and the expression (2) is not established, if the following expression (3):

$$VV-VW>CMPV \qquad (3)$$

is satisfied, the condition factor A-1 is established, wherein VV is a follower wheel speed which is an average value of the wheel speeds VWRL and VWRR of the left and right follower wheels $W_{RL}$ and $W_{RR}$; VW is a driven wheel speed which is an average value of the wheel speeds VWFL and VWFR of the left and right driven wheels $W_{FL}$ and $W_{FR}$; and CMPV is a ROM value.

A meaning of the expression (3) means is as follows: if the expression (1) is established and the expression (2) is not established, this means that a different-diameter tire has been mounted on either one of the left and right follower wheels $W_{RL}$, and $W_{RR}$ (rear wheels). In this case, a difference in speed is naturally produced between the follower wheel speed VV and the driven wheel speed VW, and expression (3) should be satisfied. In this manner, when the different-diameter tire has been mounted on either follower wheel $W_{RL}$ or $W_{RR}$ (rear wheels), even if a large rear yaw rate RID is detected, it is determined that the vehicle is in the straight advancing state, thereby validating the condition factor A-1.

When the expressions (1) and (2) are satisfied, the corresponding flags FLG are set to "1". When either one of the flags FLG is changed, the condition factor A-1 not established.

Condition factor A-2

This condition factor A-2 means that the wheel speeds VWFL, VWFR, VWRL and VWRR of all the wheels $W_{FL}$, $W_{FR}$, $W_{RL}$ and $W_{RR}$ are in a predetermined range and the following expression (4) is satisfied:

$$VDSTLO \leq VWFL \leq VDSTHI \qquad (4)$$

The expression (4) is also calculated for the other three wheels, VWFL being replaced by VWFR, VWRL and VWRR.

Condition factor A-3

This condition factor A-3 means that either the range of variation in driven wheel speed VW and the range of variation in follower wheel speed VV are within a predetermined range. More specifically, if the maximum value and minimum value of the follower wheel speed VV within a stability time (a lapsed time of n loop) are represented by $VW_{MAX}$ and $VV_{MIN}$, respectively, and the following expression (5):

$$VV_{MAX}-VV_{MIN} \leq KHV \qquad (5)$$

is satisfied, and further, if the maximum value and minimum value of the driven wheel speed VW within the stability time are represented by $VW_{MAX}$ and $VW_{MIN}$, respectively, and the following expression (6):

$$VW_{MAX}-VW_{MIN} \leq KHV \qquad (6)$$

is satisfied, the condition factor A-3 is established, wherein KHV is a ROM value.

Condition factor A-4

This condition factor A-4 means that the longitudinal acceleration FG of the vehicle is in a predetermined range, and the following expression is satisfied:

$$KMFGVW<FG<KFGVW \qquad (7)$$

The longitudinal acceleration FG is determined by time differentiating the follower wheel speed W. Each of KMFGVW and KFGVW is a ROM value.

Condition factor A-5

This condition factor A-5 means that a bad road is not being detected.

Condition factor A-6

This condition factor A-6 means that a parking brake is in its OFF state.

Condition factor A-7

This condition factor A-7 means that a foot brake is in its OFF state.

Condition factor A-8

This condition factor A-8 means that a shift change is not being carried out.

Condition factor A-9

This condition factor A-9 means that the amount of actual yaw rate CRL varied within the stability time is equal to or smaller than PCRKVW (a ROM value).

Condition factor A-10

This condition factor A-10 means that the amount of variation of a steering angle δ, varied within a stability time, is equal to or smaller than PSTKVW (a ROM value).

Condition factor A-11

This condition factor A-11 means that the number NE of revolutions of the engine is within a predetermined range. The range of 900 rpm to 7,000 rpm is optional.

Condition factor A-12

This condition factor A-12 means that the amount or variation in a driven wheel slip rate SLIPNH within the stability time is equal to or smaller than SLIPANT (a ROM value).

The driven wheel slip rate SLIPNH is determined according to the following equation (8):

$$SLIPNH=(VW-VV)\times 100/VW \qquad (8)$$

2. Stable condition B

Stable condition B corresponds to the function of the slip rate calculating means M3, and includes three condition factors B-1, B-2 and B-3. If all the condition factors B-1, B-2 and B-3 are satisfied, Stable condition B is established.

Condition factor B-1

When condition factor B-1 is satisfied, it means that the driven wheel slip rate is small, and a traction control is not carried out.

Condition factor B-2

When condition factor B-2 is satisfied, it means that the driven wheel speed VW is smaller than a target driven wheel speed VRP in the traction control.

Condition factor B-3

This condition factor B-3 means the following state: when the expression (1) in the condition factor A-1 is satisfied and the flag FLG is set at "1", i.e when the yaw rate of the driven wheels $W_{FL}$ and $W_{FR}$ is small, a driven wheel torque TQDW calculated from the throttle opening degree TH, the number NE of revolutions of the engine and the gear ratio GR satisfies the following expression (9):

$$TQDIDLF \leq TQDW \leq TQDIDHF \qquad (9)$$

and when the expression (1) in the condition factor A-1 is not satisfied and the flag FLG is not set at "1", i.e when the yaw rate of the driven wheels $W_{FL}$ and $W_{FR}$ is large, the driven wheel torque TQDW calculated from the throttle opening degree TH, the number NE of revolutions of the engine end the gear ratio GR satisfies the following expression (10):

$$TQDIDL \leq TQDW \leq TQDIDH \qquad (10)$$

wherein each of TQDIDLF, TQDIDHF, TQDIDL and TQDIDH are ROM values. The range of the driven wheel torque TQDW limited by the expression (9) is set narrow, and the range of the driven wheel torque TQDW limited by the expression (10) is set wider than the above range.

3. Stable condition C

Stable condition C corresponds to the function of the driven wheel torque calculating means M4, and includes two condition factors C-1 and C-2. If all the condition factors are satisfied, Stable condition C is established.

Condition factor C-1

Satisfaction of condition factor C-1 means that the follower wheel speed VV is equal to or larger than VVTPT (a ROM value).

Condition factor C-2

Satisfaction of condition factor C-2 means that the driven wheel torque TQDW satisfies the following expression (11):

$$TQDIDL \leq TQDW \leq TQDTPT \qquad (11)$$

wherein each of TQDIDL and TQDTPT is a ROM value. The driven wheel torque TQDW determined by the expression (11) is set within a range of relatively low torque in which clipping of the driven wheels is difficult to occur.

When Stable conditions A and B are established, or when Stable conditions A and C are established, it is determined that the driving state of the vehicle is the stable state suitable for correcting the wheel speed. A timer CRSTM is incremented during every pass through a loop at step S4 in the flow chart in FIG. 2 and TVW and TVV are sampled at step S5. TVW (n) in the nth pass through the loop is defined by the following equation (12):

$$TVW\ (n) = VV\ (1) \times VW\ (1) + VV\ (2) \times VW\ (2) + \cdots + VV\ (n) \times VW\ (n) \qquad (12)$$

and TVV (n) in nth pass through the loop, is defined by the following equation (13):

$$TVV\ (n) = VV\ (1)^2 + VV\ (2)^2 + \cdots + VV\ (n)^2 \qquad (13)$$

If the timer CRSTM reaches CRSTD at step S6 and thus, n reaches $n_{MAX}$, m (an initial value is equal to 0) is incremented at step S7. At that time, TVW ($n_{MAX}$) and TVV ($n_{MAX}$) are brought into TVW and TVV, respectively, and n, TVW (n) and TVV (n) are cleared to 0. If the driving state of the vehicle has fallen out of the Stable condition during the looping procedure, n, TVW (n) and TVV (n) are also cleared to 0.

Whenever m is incremented, KVWK is calculated at step S8 according to the following equation (14):

$$KVWK = TVV/TVW \qquad (14)$$

Subsequently, if both the expressions (1) and (2) in the condition factors A-1 are satisfied at step S9 and the respective flags FLG are set to "1", i.e. if it is ensured that the vehicle is in the steady straight advancing state with normal tires mounted thereon, KVWK is forcedly brought into 1 at step S10.

Then, the value KVWK is determined while renewing the hysteresis of KVWK1 and KVWK2 (each of which is a ROM value) in each of cases where m=1 to m=6 at step S11. The function of step S11 will be described below.

When m=1

The value KVWK calculated in the equation (14) is employed as a final value KVWK and is stored in KVWK1.

When m=2

(A) If |KVWK1−KVWK|>KVWANT, a deviation between the last value KVWK (KVWK1) and the current value KVWK is large, the current value KVWK is employed as the final value KVWK and is stored in KVWK1, returning m to 1.

(B) If |KVWK1−KWVK|≦KVWANT, the deviation between the last value KVWK (KVWK1) and the current value KVWK is small, the current value KVWK is employed as the final value KVWK.

When m=3

(A) If |KVWK1−KVWK|>KVWANT, the deviation between the last value KVWK and the current value KVWK is large, the current value KVWK is employed as the final value KVWK and stored in KVWK1, returning m to 1.

(B) If |KVWK1−KVWK|≦KVWANT, the deviation between the last value KVWK (KVWK1) and the current value KVWK is small, the current value KVWK is employed as the final value KVWK and stored in KVWK1.

As described above, when m=1, m=2 and m=3, the current value in each case is employed as the final value KVWK, and if the deviation between the last value and the current value is large, m is returned to 1, and the current value is stored in KVWK1. Therefore, m is not incremented to 4, until the deviation between the last value and the current value is successively small when m=2 and m=3. At that time, it is ensured that KVWL has stored in KVWK1 similar values three consecutive times.

When m=4

(A) If |KVWK1−KVWK|>KVWANT, the deviation between the stored value KVWK and the current value KVWK is large, the value KVWK1 (which has been ensured to have stored similar values three consecutive times) is employed as the final value KVWK, and the current value KVWK is stored in KVWK2.

(B) If |KVWK1−KVWK|≦KVWANT, the deviation between the stored value KVWK and the current value KVWK is small, the current value KVWK is employed as the final value KVWK, and m is returned to 3.

When m=5

(A) If |KVWK2−KVWK|>KVWANT, the deviation between the stored value KVWK and the current value of KVWK is large, the stored value KVWK1 is employed as the final KVWK, and m is returned to 3.

(B) If |KVWK2−KVWK|≦KVWANT, the deviation between the stored value KVWK2 and the current value KVWK is small, the stored value KVWK1 is employed as the final KVWK.

When m=6

(A) If |KVWK2−KVWK|>KVWANT, the deviation between the stored value KVWK2 and the current value KVWK is large, the stored value KVWK1 is employed as the final KVWK, returning m to 3.

(B) If |KVWK2−KVWK|≦KVWANT, the deviation between the stored value KVWK2 and the current value KVWK is small, the current value KVWK is employed as the final KVWK, and m is returned to 3.

As described above, if the deviation is small when m=4, m is returned to 3. Therefore, unless the deviation is increased, the operation for returning from 4 to 3 is repeated, and the current value is employed. On the other hand, if the deviation is increased when m=4, the value KVWK (which has been ensured to have stored similar values three consecutive times) is stored in KVWK1 , only when the deviation between the last value and the current value of KVWK is successively small when m=5 and when m=6, thereby returning m to 3. If the deviation between the last value and the current value of KVWK is large while the processing is carried out when m=4, m=5 and m=6, the value KVWK1 stored when m=3 is employed.

When the final value KVWK is calculated in the above manner, the processing is advanced to step S12. If KVWK is in a range between KVWNHL and KVWNHH (which are ROM values) at step S12, a correcting factor KVW is set at 1 at step S13. If the value KVWK is larger than KVWMAX which is a ROM value, or smaller than KVWMIN which is a ROM value at step S14, a limiting process for bringing KVWMAX into KVWK and bringing KVWMIN into KVWK is carried out at step S15. If KVWK is not in the range between KVWNHL and KVWNHH, this value KVWK is determined as a final correcting factor KVW.

When m=1 at step S16, the correcting factor KVW is forcedly brought into 1 at step S17. Thus, even if the driven wheels WFL and WFR slip during starting of the vehicle, and KVWK exceeds 1, the correction of the wheel speed can be prohibited.

At step S18, all of CRSTM, TVW, TVV, the MAX value, the MIN value and the like are reset to 0, and the correction of the wheel speed is carried out at step S19. Namely, a value VWFL×KVW resulting from the multiplication of the left driven wheel speed VWFL by the correcting factor KVW is determined as a left driven wheel speed, and a value VWFR×KVW resulting from the multiplication of the right driven wheel speed VWFR by the correcting factor KVW is determined as a right driven wheel speed. Thus, even if a different-diameter tire has been mounted, a proportional relationship between the driven and follower wheel speeds VW and VV is maintained, thereby enabling a precise traction control to be carried out.

Although the embodiment of the present invention has been described in detail, it will be understood that the present invention is not limited to the above-described embodiment, and various modifications in design may be made without departing from the spirit and scope of the invention defined in claims.

For example, in place of correcting the driven wheel speed by the correcting factor, the follower wheel speed can be corrected.

What is claimed is:

1. A wheel speed correcting system, comprising:
    a driving-state detecting means for detecting a driving state of a vehicle, including at least a driven wheel speed and a follower wheel speed;
    a steady straight advancing state presuming means for presuming a steady straight advancing state of the vehicle based on an output from said driving-state detecting means;
    a slip rate calculating means for calculating a slip rate of the driven wheel based on the output from said driving-state detecting means;
    a driven wheel torque calculating means for calculating a torque of the driven wheel based on the output from said driving-state detecting means;
    a speed ratio calculating means for calculating a speed ratio of the driven wheel speed to the follower wheel speed;
    a correcting means for correcting the driven wheel speed or the follower wheel speed based on an output from said speed ratio-calculating means; and
    a correction execution determining means for determining whether to allow execution of the correction of the driven wheel speed by said correcting means, allowing execution of the correction,
        when said steady straight advancing state presuming means presumes a steady straight advancing state of the vehicle and the slip rate of the driven wheel calculated by said slip rate calculating means is equal to or smaller than a predetermined value, or
        when said steady straight advancing state presuming means presumes the steady straight advancing state of the vehicle and the torque of the driven wheel calculated by said driven wheel torque
    calculating means is equal to or smaller than a predetermined value.

2. A wheel speed correcting system according to claim 1, wherein said steady straight advancing state presuming means presumes the steady straight advancing state of the vehicle, if a difference in speed between the driven and follower wheel speeds is equal to or larger than a predetermined value even if the yaw rate of the vehicle is not within a predetermined value.

3. A wheel speed correcting system according to claim 1, wherein said steady straight advancing state presuming means does not presume the steady straight advancing state of the vehicle, if an amount of driven wheel speed varied within a predetermined time or an amount of follower wheel speed varied within a predetermined time is equal to or larger than a predetermined value.

4. A wheel speed correcting system according to claim 1, wherein said steady straight advancing state presuming means presumes the steady straight advancing state of the vehicle based on the output from said driving-state detecting means for a predetermined time.

5. A wheel speed correcting system according to claim 1, wherein said speed ratio calculating means calculates a speed ratio based on a plurality or driven wheel speeds and follower wheel speed detected for a predetermined time.

* * * * *